United States Patent
Chen et al.

(10) Patent No.: US 11,640,288 B2
(45) Date of Patent: May 2, 2023

(54) SYSTEM VERSION UPGRADING METHOD AND APPARATUS

(71) Applicant: C-SKY Microsystems Co., Ltd., Zhejiang (CN)

(72) Inventors: Xianshao Chen, Hangzhou (CN); Yucan Gu, Hangzhou (CN); Jiaqi Zhu, Hangzhou (CN); Jiuchao Cui, Hangzhou (CN)

(73) Assignee: C-SKY Microsystems Co., Ltd., Hangzhou (CN)

( * ) Notice: Subject to any disclaimer, the term of this patent is extended or adjusted under 35 U.S.C. 154(b) by 0 days.

(21) Appl. No.: 16/175,741

(22) Filed: Oct. 30, 2018

(65) Prior Publication Data

US 2019/0095193 A1 Mar. 28, 2019

Related U.S. Application Data

(63) Continuation of application No. PCT/CN2018/107674, filed on Sep. 26, 2018.

(30) Foreign Application Priority Data

Sep. 26, 2017 (CN) .......................... 201710881265.0

(51) Int. Cl.
 G06F 8/65 (2018.01)
 G06F 11/14 (2006.01)
 G06F 8/71 (2018.01)

(52) U.S. Cl.
 CPC ............ *G06F 8/65* (2013.01); *G06F 11/1469* (2013.01); *G06F 8/71* (2013.01); *G06F 2201/84* (2013.01)

(58) Field of Classification Search
 CPC .......... G06F 8/65; G06F 8/71; G06F 11/1469; G06F 2201/84
 See application file for complete search history.

(56) References Cited

U.S. PATENT DOCUMENTS

| 8,745,612 B1 | 6/2014 | Semenzato et al. |
| 2004/0117541 A1* | 6/2004 | Lei ............................ G06F 8/65 711/103 |

(Continued)

FOREIGN PATENT DOCUMENTS

| CN | 102662699 A | 9/2012 |
| CN | 103106086 A | 5/2013 |

(Continued)

OTHER PUBLICATIONS

Ellyne Phneah, "Hardware-based security more effective against new threats" 2013 [retrieved on Sep. 30, 2020], pp. 1-3, downloaded from <url>:https://web.archive.org/web/20160709065232/https://www.zdnet.com/article/hardware-based-security-more-effective-against-new-threats/. (Year: 2013).*

(Continued)

*Primary Examiner* — S. Sough
*Assistant Examiner* — Stephen D Berman
(74) *Attorney, Agent, or Firm* — Finnegan, Henderson, Farabow, Garrett & Dunner, LLP

(57) ABSTRACT

Embodiments of the disclosure provide a method and apparatus for upgrading a system version of a system. The method can include: acquiring, using circuitry, from a first storage space a current system version identification corresponding to a current system version; acquiring, using circuitry, from a second storage space a backup system version identification corresponding to a backup system version; comparing, using circuitry, the current system version identification with the backup system version identification; and configuring the system based on the comparison.

20 Claims, 3 Drawing Sheets

(56) References Cited

U.S. PATENT DOCUMENTS

| | | |
|---|---|---|
| 2008/0244556 A1 | 10/2008 | Plante et al. |
| 2014/0130151 A1* | 5/2014 | Krishnamurthy ......... G06F 8/65 726/22 |
| 2014/0250290 A1* | 9/2014 | Stahl ..................... H04L 9/3247 713/2 |
| 2015/0019698 A1* | 1/2015 | Ravi ......................... G06F 9/54 709/221 |
| 2015/0120809 A1* | 4/2015 | Braemer ................. H04L 67/42 709/203 |
| 2017/0123779 A1* | 5/2017 | Albot .................... G06F 12/109 |
| 2017/0124353 A1* | 5/2017 | Arora .................... G06F 21/645 |
| 2017/0308705 A1* | 10/2017 | Karaginides .......... G06F 21/575 |
| 2017/0329538 A1* | 11/2017 | Benoit ................ G06F 12/1408 |
| 2018/0048473 A1* | 2/2018 | Miller ....................... G06F 8/65 |
| 2018/0060607 A1* | 3/2018 | Tasher .................. H04L 9/3247 |
| 2018/0267726 A1* | 9/2018 | Sun ......................... G06F 21/78 |

FOREIGN PATENT DOCUMENTS

| | | |
|---|---|---|
| CN | 103617246 A | 3/2014 |
| CN | 104798040 A | 7/2015 |
| CN | 104881286 A | 9/2015 |
| CN | 104956374 A | 9/2015 |
| CN | 106558339 A | 4/2017 |
| CN | 107678762 A | 2/2018 |
| WO | WO 2009/068931 A1 | 6/2009 |
| WO | WO 2009/156302 A1 | 12/2009 |
| WO | WO 2019/062770 A1 | 4/2019 |

OTHER PUBLICATIONS

Wikipedia, "Flash Memory," 2016 [retrieved on Sep. 25, 2021], pp. 1-28, downloaded from the Wayback Machine Internet Archive at <url>: https://web.archive.org/web/20161224193959/https://en.wikipedia.org/wiki/Flash_memory. (Year: 2016).*

First Search Report dated Sep. 23, 2019 Application No. 201708812650 (2 pages).

First Office Action issued from the State Intellectual Property Office of People's Republic of China dated Oct. 8, 2019 Application No. 201710881265.0 (16 pages).

International Search Report dated Jan. 4, 2019 for corresponding PCT International Applicational No. PCT/CN2018/107674 (7 pages).

Supplemental Chinese Search Report issued in corresponding Chinese Application No. 201710881265.0 dated Apr. 27, 2020 (1 page).

Extended European Search Report and supplementary European Search Report in European Application No. 18862066.0 dated Oct. 14, 2020 (6 pgs).

Communication from the Examining Division issued by European Patent Office in corresponding with European Application No. 18 862 066, dated Sep. 2, 2022. (7 pages).

* cited by examiner

SYSTEM VERSION UPGRADING METHOD AND APPARATUS

CROSS REFERENCE TO RELATED APPLICATION

The present application claims priority to International Application No. PCT/CN2018/107674, filed on Sep. 26, 2018, which claims the benefits of priority to Chinese application number 201710881265.0, filed Sep. 26, 2017, both of which are incorporated herein by reference in their entireties.

BACKGROUND

With continuous development of computer hardware and software systems, vulnerabilities and defects of a software system generally appear after the software system is used for a period of time. These vulnerabilities and defects cannot meet current software application requirements, and therefore, software developers often need to repair and correct vulnerabilities and defects of the software system, so as to generate a new software system version to meet use requirements. Malicious programs, however, can reproduce the vulnerabilities and defects of the old software system version in a manner of rolling back the software system version and then attacking the whole system through the vulnerabilities and defects of the system version.

To prevent the version of a software system from being rolled back by a malicious program, convention systems often recommend upgrade in the software level and store the latest upgrade strategy compulsively. These conventional systems utilize this upgrade protection strategy mainly in the software level. If, however, a software driver closes upgrade or modifies a system version identification number to shield the system upgrade, the security of the software system version cannot be guaranteed.

SUMMARY OF THE DISCLOSURE

Embodiments of the disclosure provide a method for upgrading a system version of a system. The method can include: acquiring, using circuitry, from a first storage space a current system version identification corresponding to a current system version; acquiring, using circuitry, from a second storage space a backup system version identification corresponding to a backup system version; comparing, using circuitry, the current system version identification with the backup system version identification; and configuring the system based on the comparison.

Embodiments of the disclosure further provide an apparatus for upgrading a system version of a system. The apparatus can include: a first storage space configured to store a current system version identification corresponding to a current system version; a second storage space configured to store a backup system version identification corresponding to a backup system version; and comparison circuitry having circuitry to compare the current system version identification with the backup system version identification, and triggering circuitry having circuitry to trigger an upgrade of the system version according to the backup system version associated with the backup system version identification in response to the comparison.

BRIEF DESCRIPTION OF THE DRAWINGS

To illustrate the technical solutions in the disclosed embodiments more clearly, the accompanying drawings describe the embodiments in the following. It is apparent that the accompanying drawings in the following description are only some embodiments of the present disclosure. Those of ordinary skill in the art can obtain other features according to the accompanying drawings without creative efforts.

DETAILED DESCRIPTION

To make the objectives, technical solutions, and advantages of the embodiments of the present disclosure clearer, the technical solutions in the embodiments of the present disclosure are described clearly and completely in the following with reference to the accompanying drawings in the embodiments of the present disclosure. Apparently, the described embodiments are merely some, rather than all, of the embodiments of the present disclosure. Based on the embodiments in the present disclosure, all other embodiments obtained by those of ordinary skill in the art without creative efforts should belong to the protection scope of the present disclosure.

To overcome the issues with convention systems, the disclosed embodiments describe a method and apparatus for upgrading computer device system version for effectively solving the problem that a system version is vulnerable and degradable.

Figure 1:
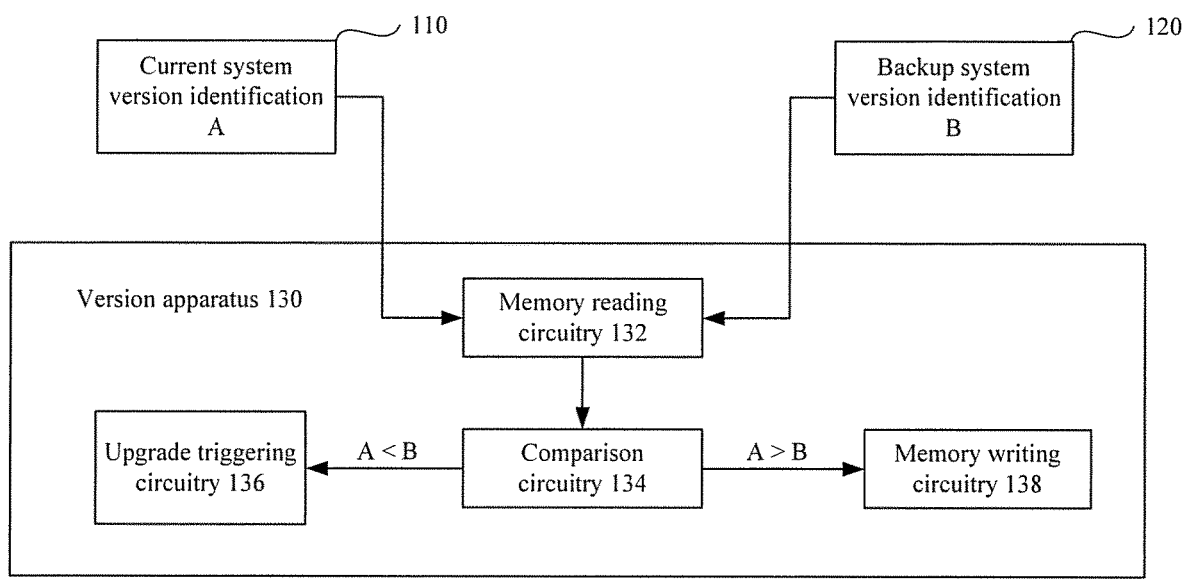
FIG. 1 is a schematic diagram of an exemplary apparatus for upgrading a system version, according to some embodiments of the present disclosure.

Some embodiments of the present disclosure provide a system for upgrading a system version. FIG. 1 is a schematic diagram of an apparatus for upgrading a system version, according to some embodiments of the present disclosure. As shown in FIG. 1, there are two non-volatile storage spaces in a computer hardware device (e.g., the apparatus of FIG. 1). The first storage space 110 can be configured to store a current system version identification A, and the second storage space 120 can be configured to store a backup system version identification B.

For example, the current system version identification A stored in the first storage space 110 is a version number of a currently running system, and the backup system version identification B stored in the second storage space 120 is a highest system version number among all historical system versions.

In some embodiments, the first storage space 110 is visible to software, and the software can modify the current system version identification A by changing the current system running version. The second storage space 120 is invisible to the software, and the backup system version identification B can only be accessed and updated by means of hardware. Moreover, data update can be performed by the hardware only when a version number of the currently running system version stored in the current system version identification A is greater than the version identification mark B.

Further, the computer hardware device can further include a version apparatus 130. The version apparatus 130 can include memory reading circuitry 132, comparison circuitry 134, upgrade triggering circuitry 136, and a memory writing circuitry 138.

In the version apparatus 130, the memory reading circuitry 132 can be configured to acquire the current system version identification A in the first storage space 110 and the backup system version identification B in the second storage space 120. The memory reading circuitry 132 can access the two storage spaces and acquire data when the system is powered up or running, when the current system version identification A in the first storage space 110 is changed. The memory reading circuitry 132 can also access the two storage spaces and acquire data by a software driver.

For example, when the system is powered up, the memory reading circuitry 132 can be triggered automatically. In this case, the memory reading circuitry 132 can access the first storage space 110 and the second storage space 120, and store data from the two storage spaces into two groups of registers, respectively, located in version apparatus 130. The stored data can be further used by the comparison circuitry 134.

When the current system version identification A in the first storage is changed, the memory reading circuitry 132, which can be storage media, can be triggered to acquire data, so as to acquire system version numbers in the first storage 110 space and the second storage space 120, and store the system number versions in two groups of registers, respectively.

In some embodiments, after the memory reading circuitry 132 completes data acquisition, a control signal representing that the data has been prepared can be set to a value "1" to indicate that the comparison circuitry 134 can start data comparison.

In the version apparatus 130, the comparison circuitry 134 can be configured to compare the value of the current system version number with the value of the backup system version number stored in the registers of the memory reading circuitry 132. In some embodiments, in the comparison circuitry 134, default values of storage data in non-volatile memories used by the system are all F when the non-volatile memories are shipped out of the factory. Therefore, a comparison standard for comparing magnitudes of the data of the two memories is set as follows: all F is the minimum value and all 0 is the maximum value.

In some embodiments, when the comparison circuitry 134 receives the control signal, which is set to "1" and indicates that data preparation of the previous-level memory reading circuitry 132 is completed, the comparison circuitry 134 can compare values of the two groups of registers, and determine magnitudes of the version numbers of the current system version identification A and the backup system version identification B.

In some embodiments, the comparison circuitry 134 can generate three kinds of behaviors after finishing the comparison. In the first behavior, if the current system version identification A is less than the backup system version identification B, an upgrade control signal representing that the current system version number is lower than the historical system version number and needs to upgrade the system can be set to 1 to instruct a next-level upgrade triggering circuitry to upgrade the system.

In the second behavior, if the current system version identification A is greater than the backup system version identification B, an update control signal representing that the current system version number is higher than the historical system version number and the historical system version number needs to be updated can be set to "1" to instruct a next-level memory writing circuitry 138 to perform data update for the backup system version identification B, and send the data of the current system version identification A to the memory writing circuitry 138.

In the third behavior, if the current system version identification A is equal to the backup system version identification B, the current system can start normally and inform an external system that the current system version number has been checked, and the version apparatus 130 can be initialized to wait for the next check of the system version number.

In the version apparatus 130, the upgrade triggering circuitry 136 can be configured to trigger the current system to perform version upgrade. During triggering of the upgrade, a part of storage can be limited such that the system can only run a system upgrade program at this point, and other functional programs cannot be executed normally. After the update is completed, the operating system can be rebooted, so as to update the current running system version to the latest system version.

In some embodiments, when the upgrade control signal is set to "1" indicating that the system needs to be upgraded is received from the previous-level comparison circuitry 134, the upgrade triggering circuitry 136 can trigger an upgrade of the system. After the system upgrade is successful, the operating system can be rebooted, for example by hardware, and version check of the version apparatus 130 can be triggered again to check whether the system version after the update is greater than or equal to the highest historical system version, until the current system version is greater than or equal to the highest historical system version.

In the version apparatus 130, the memory writing circuitry 138 can be configured to update the backup system version identification B in the second storage space. That is, when the current system version identification A is written into the second storage space, the backup system version identification B can be updated to the current system version identification A to serve as the highest historical version number.

In some embodiments, when the update control signal indicates that data update needs to be performed for the backup system version identification B is set to 1, data update in the second storage space can be triggered. The memory writing circuitry 138 can write the current system version identification A transmitted by the previous-level comparison circuitry 134 into the second storage space 120, and update the data of the backup system version identification B to the current system version identification A. After data update of the second storage space is successful, the external system can be informed that the current system version number has been checked, and the version apparatus 130 can be initialized to wait for the next check of system version number.

In some embodiments, the memory writing circuitry can update the second storage space where the backup system version identification B is located. To minimize any tampering of the data, the second storage space 120 can only allow access from a hardware memory writing circuitry 138, and does not have any software programming interface. Accordingly, software cannot update the data of the second storage space 120 where the backup system version identification B is located in any manner, thus guaranteeing the security of the backup system version identification.

Figure 2:
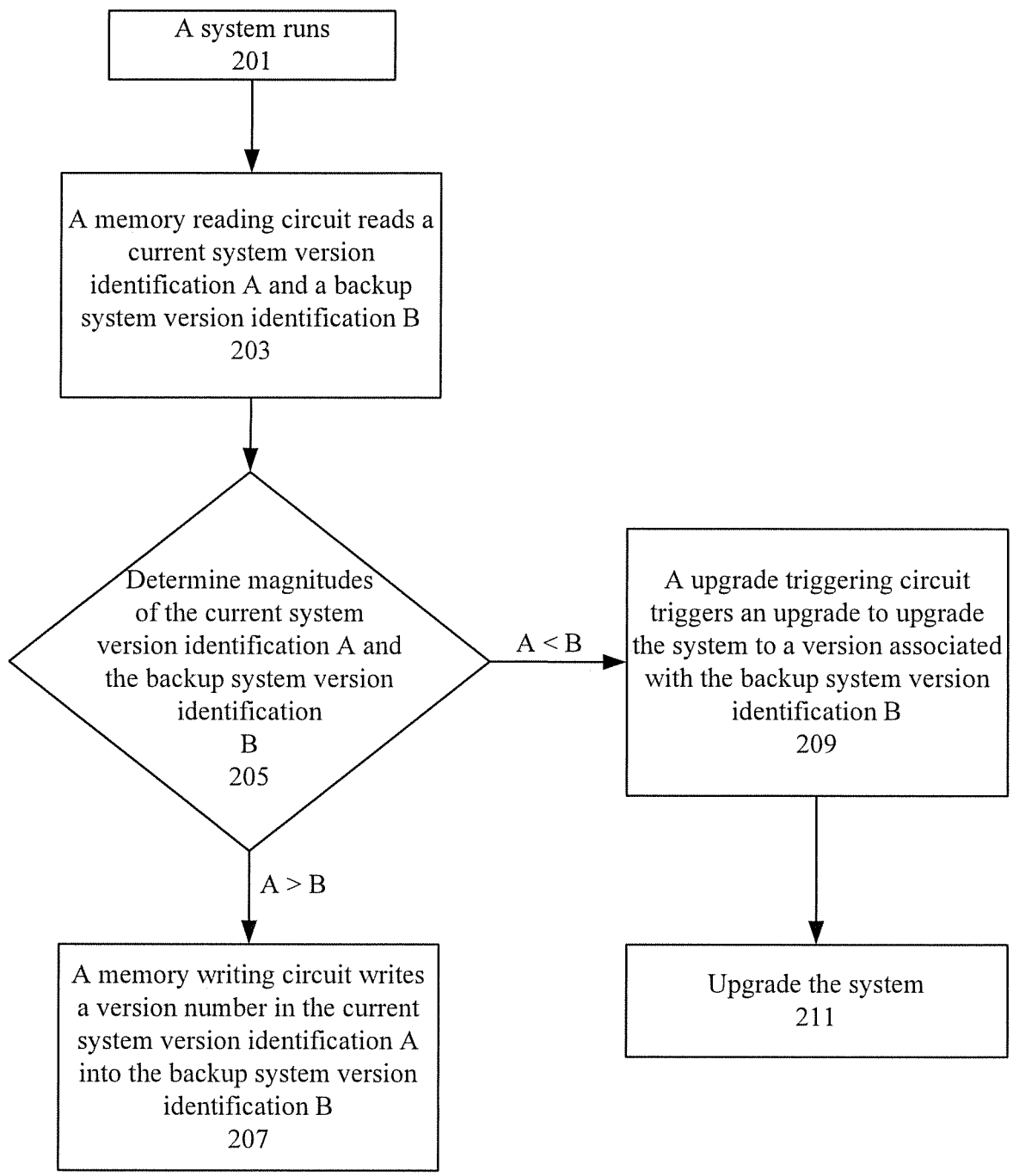
FIG. 2 is an exemplary diagram illustrating a system version be upgraded, according to some embodiments of the present disclosure.

FIG. 2 is a schematic diagram of upgrading a system version, according to embodiments of the present disclosure. As shown in FIG. 2, at 201, a computer system runs. At 203, a memory reading circuitry can read a current system identification mark A in a first storage area and a backup system version identification B in a second storage space, and determines (205) the versions of the current system identification mark A and the backup system identification mark B. If A<B, at 209, an upgrade triggering circuitry can trigger the system to upgrade (211) the current system to a version of the backup system identification mark B, and an operating system can reboot after the update is completed, so as to update the system version to the latest system version. If A>B, a memory writing circuit writes a version number in the current system identification mark A into the backup system identification mark B.

Figure 3:
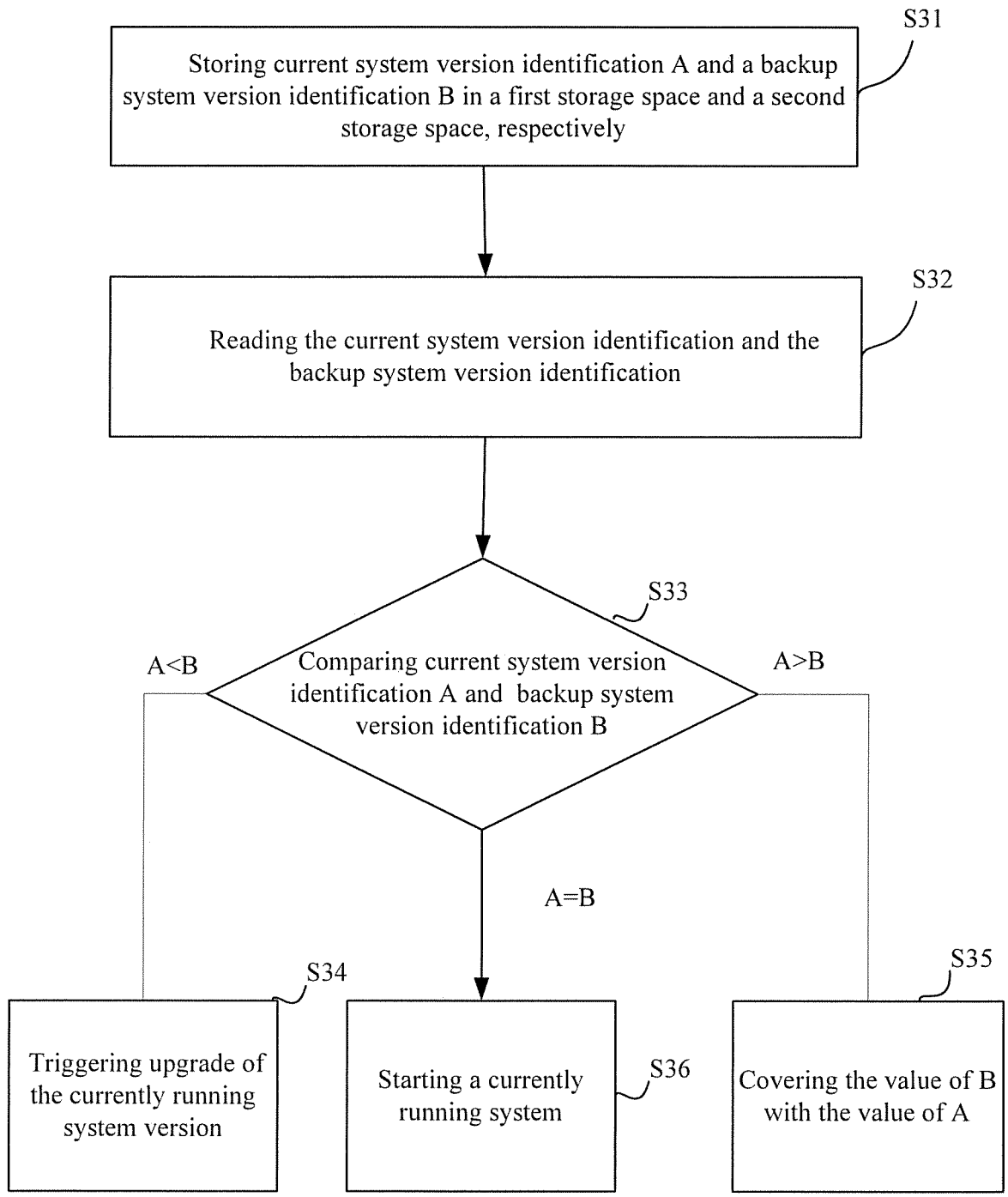
FIG. 3 is a flowchart of an exemplary method for upgrading a system version, according to embodiments of the present disclosure.

FIG. 3 is a flowchart of a method for upgrading a system version, according to embodiments of the present disclosure. As shown in FIG. 3, in S31, a first storage space and a second storage space store a current system version identification A and a backup system version identification B, respectively.

In S32, a version apparatus reads the current system version identification A and the backup system version identification B. In S33, a comparison circuitry compares the version of the current system version identification A with the version of the backup system version identification B.

In S34, when A<B, an upgrade triggering circuitry triggers an upgrade of a currently running system version and a restart of the system. In S35, when A>B, a memory writing circuit updates a value of the backup system version identification B with a value of the current system version identification A. In S36, when A=B, the currently running system can be started.

In the present disclosure, the version apparatus 130 can compare the version of the current system version identification A with the version of the backup system version identification B. The backup system version identification B only allows to be updated by using a hardware circuit of the version apparatus 130. The memory reading circuitry and the comparison circuitry in the version apparatus 130 can be implemented by hardware, and software cannot participate in reading, comparing and updating processes. Thus, software can be prevented from participating in the storage and update processes and modification of the backup system version identification, so as to prevent a malicious program from attacking by lowering the version. In addition, the version apparatus 130 can trigger the version upgrading circuitry automatically, so as to ensure that the version number of the current system version identification A cannot be lower than that of the backup version identification mark B, thus guaranteeing the irreversibility of the system version upgrade.

The system version upgrading method and apparatus provided in embodiments of the present disclosure can implement comparing and updating of a current system version identification and a backup version identification mark by using hardware, so as to prevent software from participating in circuit control and storage update processes and effectively guarantee the irreversibility of the system version upgrade, thus protecting the system security.

Specific implementations of the present disclosure are described above, but the protection scope of the present disclosure is not limited to these implementations. Any change or replacement that can be easily conceived of by those skilled in the art without departing from the technical scope disclosed by the present disclosure should be covered in the protection scope of the present disclosure. Therefore, the protection scope of the present disclosure should be subject to the protection scope of the claims.

The invention claimed is:

1. A method for upgrading a system version of a system on a computer hardware device, comprising:

in response to the system powering up, acquiring, using storage media, from a first storage space in the computer hardware device a current system version identification corresponding to a current system version;

acquiring, using the storage media, from a second storage space in the computer hardware device a backup system version identification corresponding to a backup system version that is a highest system version of the system among all historical system versions on the computer hardware device, the second storage space being a non-volatile storage space in the computer hardware device and being configured to store the backup system version identification;

storing the current system version identification, acquired from the first storage space, into a first group of two groups of registers of memory reading circuity in the computer hardware device and the backup system version identification, acquired from the second storage space, into a second group of the two groups of registers;

comparing, using a comparison circuitry, the current system version identification stored in the first group of the two groups of registers with the backup system version identification stored in the second group of the two groups of registers, wherein the comparison circuitry is a hardware implementation where software cannot participate in reading, comparing, and updating the backup system version identification; and configuring the system based on the comparison, wherein the system is configured to start in response to a determination that the current system version identification is equal to the backup system version identification.

2. The method according to claim 1, wherein configuring the system based on the comparison further comprises:

in response to the current system version identification being less than the backup system version identification, triggering an upgrade of the system version according to the backup system version corresponding to the backup system version identification, wherein the backup system version is used for initiating the system.

3. The method according to claim 2, further comprising:

determining whether the upgrade fails; and in response to the determination that the upgrade fails, forcing, by hardware, the system into a constant reboot mode or a crashed mode.

4. The method according to claim 2, wherein triggering the upgrade of the system version further comprises:

suspending current system processes in the system; and initializing an upgrading process for upgrading the system with the backup system version corresponding to the backup system version identification.

5. The method according to claim 1, wherein configuring the system based on the comparison further comprises:

in response to the current system version identification being the same as the backup system version identification, using the current system version when the system is initiated.

6. The method according to claim 1, wherein configuring the system based on the comparison further comprises:

in response to the current system version identification being greater than the backup system version identification, writing, using hardware, the current system version identification to the second storage space.

7. The method according to claim 6, wherein the second storage space cannot be updated by software.

8. The method according to claim 1, wherein the current system version identification in the first storage space is updated by software.

9. The method according to claim 1, wherein acquiring the current system version identification and acquiring the backup system version identification are in response to the system starting or to the current system version having been updated.

10. An apparatus for upgrading a system version of a system on a computer hardware device, the apparatus being included in the computer hardware device and comprising:
a first storage space configured to store a current system version identification corresponding to a current system version, wherein the current system version identification is acquired from the first storage space in response to the system powering up;
a second storage space configured to store a backup system version identification corresponding to a backup system version that is a highest system version of the system among all historical system versions on the computer hardware device, the second storage space being a non-volatile storage space in computer hardware device of the system;
memory reading circuitry having two groups of registers and configured to access the first storage space and the second storage space and to store the current system version identification from the first storage space into a first group of the two groups of registers and the backup system version identification acquired from the second storage space into a second group of the two groups of registers; and
comparison circuitry having circuitry to compare the current system version identification, stored in the first group of the two groups of registers, with the backup system version identification, stored in the second group of the two groups of registers, wherein the comparison circuitry is a hardware implementation where software cannot participate in reading, comparing, and updating the backup system version identification, and
triggering circuitry having circuitry to trigger an upgrade of the system version according to the backup system version corresponding to the backup system version identification in response to the comparison, wherein the system is configured to start in response to a determination that the current system version identification is equal to the backup version identification.

11. The apparatus according to claim 10, wherein the triggering circuitry has circuitry to trigger an upgrade of the system version according to the backup system version corresponding to the backup system version identification in response to the comparison circuitry making a determination that the current system version identification is less than the backup system version identification.

12. The apparatus according to claim 10, wherein in response to the comparison circuitry making a determination that the current system version identification is the same as the backup system version identification, the current system version is used when the system is initiated.

13. The apparatus according to claim 10, wherein the comparison circuitry and the triggering circuitry are part of a version apparatus that is separate from the first storage space.

14. The apparatus according to claim 13, wherein the memory reading circuitry has circuitry to read the current system version identification from the first storage space and the backup system version identification from the second storage space.

15. The apparatus according to claim 14, wherein the memory reading circuitry includes a plurality of registers.

16. The apparatus according to claim 14, wherein the memory reading circuitry reads the current system version identification from the first storage space and the backup system version identification from the second storage space in response to the system starting or to the current system version having been updated.

17. The apparatus according to claim 13, wherein the version apparatus further comprises memory writing circuitry having hardware to write the current system version identification to the second storage space in response to the comparison circuitry making a determination that the current system version identification is greater than the backup system version identification.

18. The apparatus according to claim 17, wherein the memory writing circuitry has exclusive writing privileges to the second storage space.

19. The apparatus according to claim 10, wherein the current system version identification in the first storage space is updated by software.

20. The apparatus according to claim 10, wherein the second storage space cannot be updated by software.

* * * * *